Patented June 12, 1928.

1,673,275

UNITED STATES PATENT OFFICE.

LEO WALLERSTEIN, OF NEW YORK, N. Y., ASSIGNOR TO WALLERSTEIN COMPANY, INC., OF NEW YORK, N. Y., A CORPORATION OF NEW YORK.

PROCESS OF MAKING ALCOHOL-REDUCED CEREAL BEVERAGES RICH IN PROTEINS.

No Drawing. Application filed August 13, 1920, Serial No. 403,213. Renewed April 4, 1928.

This invention relates to an improved process for making alcohol reduced cereal beverages having the flavor of malt and hops, and to an improved beverage.

Alcohol-reduced cereal beverages are characterized, among other things, not only by a low alcoholic content, but by a relatively low protein content. In making these beverages, a wort is used which has a low total extract content, i. e., a wort which has a low gravity due to the small percentage of extract it contains, this being done not only to avoid a high fermentation, but also to avoid producing a beverage which is too high in extract matters, such as carbohydrates. A beverage which is too high in carbohydrates does not have a satisfactory taste, and is regarded as difficult of digestion. Ordinarily, therefore, such beverages are prepared from a wort having an original gravity of about 5° to 7° Balling, and are, therefore, low in protein content. Being relatively low in proteins, such beverages not only lack the stimulating effect of the alcohol but they also lack the stimulating and satisfying effect of the proteins. Further, they are apt to be deficient in foam producing and foam keeping qualities and they do not absorb gas well during carbonating.

According to the present invention, a beverage is produced which has a low alcoholic content but which is high in proteins, so that the loss in stimulating effect due to the absence of alcohol is replaced to a certain extent by increase in the protein content. Due, furthermore, to the increase in the protein content, such beverages are high in nutritive quality and have an increased palatability and also increased foam producing and foam keeping qualities.

In carrying the invention into effect, a mash may be made in the usual way or the mash may be made from an extract. An extract which is highly suitable for the purpose is described in my application No. 403,211 filed of even date herewith, which discloses an improved extract having malt as a base.

During the manufacture, there is added material rich in soluble, non-coagulable proteins. This material will usually consist of proteolyzed proteins which may be obtained from a wide range of sources. The cake which remains after compressing soya beans, cotton seed, etc., is rich in proteins and forms an excellent material, as are also the residual grains from breweries and distilleries.

Where oil cake, such as has been referred to, is used, any disagreeable taste which the proteolyzed liquor may have can be removed in any suitable way, such as by treating with bone char.

The protein containing material may be brought into proper condition for use by subjecting it to the action of a proteolytic enzym, such as pepsin or papain, the material being made into a mash to which the enzym is added. This mash is maintained at suitable temperature for proteolysis, care being taken that the temperature is not so high as to prevent or substantially impair the action of the proteolytic enzym. The amount of enzym employed and the time required for proteolysis will vary according to the protein containing material selected, the enzym used and the thoroughness with which the proteolysis is carried out. Ordinarily, the addition of one pound of U. S. P. pepsin 1:3000, or a pound of the ordinary commercial preparations of papain, may be employed to one hundred pounds of protein contained in the mash, and, under favorable conditions, complete proteolysis should be effected in from twenty-four to forty-eight hours.

After proteolysis, the liquor containing the proteolyzed proteins should be filtered to remove the insoluble residue, such as husk, woody fiber, and the undissolved proteins, if any, and it may, if desired, be concentrated to a greater or less degree. This material containing the soluble, non-coagulable proteins in incorporated in the mesh at any suitable time in the process, though, as a rule, it will be added after conversion and before boiling in the kettle.

Instead of accomplishing the proteolysis of the proteins by means of enzyms, good results may also be obtained, by the proteolysis of the proteins by means of acid hydrolysis. The liquor which contains the soluble proteins and the acid used for hydrolysis is preferably neutralized before concentration.

The alcohol content of the beverage will, of course, depend on the amount of fermentation which the wort is allowed to undergo, or upon whether the beverage is dealcoholized after fermentation. The present invention is not concerned, however, with the specific steps of finishing the beverage, which may be carried out in a usual way.

A beverage produced in accordance with the above process may easily have a protein content of 0.7 per cent and this may be increased to 2 per cent, and possibly more.

What is claimed is:

1. The process of making a cereal alcohol reduced beverage which consists in making a mash, converting and finishing into a beverage, and during the process incorporating in the mash material which is rich in soluble non-coagulable proteins.

2. The process of making a cereal alcohol-reduced beverage which consists of making a mash, converting and finishing into a beverage and during the process adding thereto a material which has been rendered rich in soluble non-coagulable proteins by the action of proteolytic enzyms.

3. The process of making a cereal alcohol-reduced beverage which consists in making a mash from a material containing malt, converting and finishing into a beverage and during the process adding thereto a material which is rich in soluble non-coagulable proteins.

4. The process of making a cereal alcohol-reduced beverage which consists in making a mash from a material containing malt, converting and finishing into a beverage and during the process adding thereto a material which is rendered rich in soluble non-coagulable proteins by the action of a proteolytic enzym.

5. The process of making a cereal beverage rich in soluble non-coagulable proteins and low in alcohol, which consists in making a mash low in carbohydrates, allowing conversion to take place therein, then adding a material containing soluble, non-coagulable proteins then boiling and finishing as a beverage.

6. A cereal beverage having a protein content of not less than 0.7 per cent.

In testimony whereof, I have hereunto set my hand.

LEO WALLERSTEIN.